Oct. 8, 1935.  W. W. FASSETT  2,016,670
SAMPLING DEVICE
Filed Feb. 10, 1933
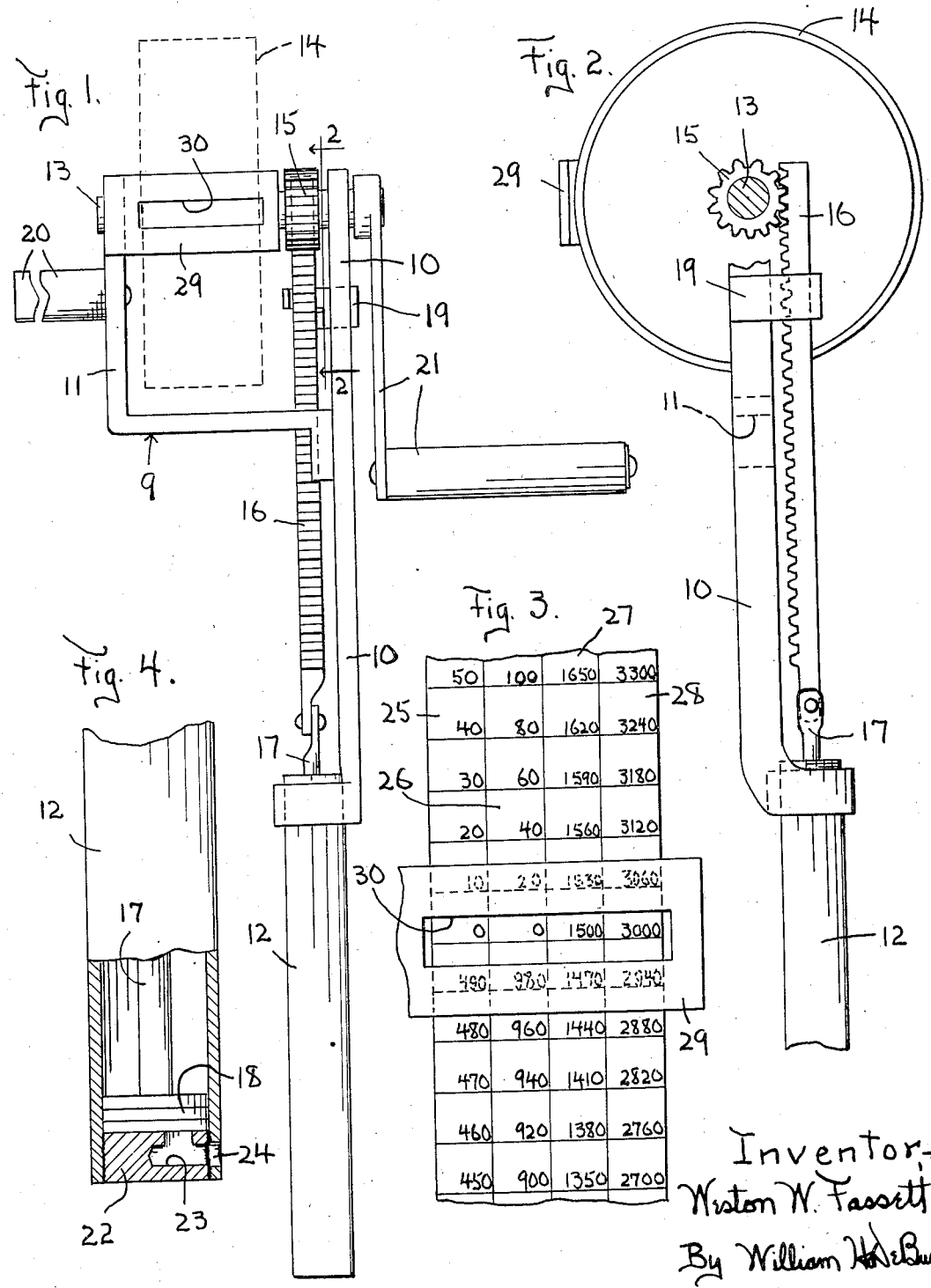
Inventor—
Weston W. Fassett,
By William H. DeBuck,
Attorney.

Patented Oct. 8, 1935

2,016,670

UNITED STATES PATENT OFFICE 2,016,670

SAMPLING DEVICE

Weston W. Fassett, Gonzales, Calif.

Application February 10, 1933, Serial No. 656,183

4 Claims. (Cl. 73—21)

My invention relates to sampling devices and is designed particularly for use for taking samples of milk for determination of the butter fat content. It is the object of my invention to provide a new and improved form and arrangement of parts in a device of this type by which an improved operation and effect may be attained.

Under the laws and regulations governing the collection of milk in at least some of the States it is required that the milk delivered by each individual seller be weighed each day upon delivery and that a sample be retained each day proportionate to the amount of milk delivered. The sample to be retained must be large enough in connection with small deliveries of milk to insure that the aggregate amount of the samples for the usual weekly or other prescribed testing periods shall be great enough for enabling the operator to carry out properly the required tests. At the same time the samples in connection with comparatively much larger deliveries by a different seller must be small enough to be workable and of such limited size as to be capable of being held within a reasonable storage space along with the samples of others.

It is the object of my invention to provide a device for taking variable sized samples from the deliveries of different sellers, the samples from the deliveries of each seller being taken always on the same proportional basis from day to day but the proportions in connection with the samples from one seller being different from the proportions in connection with the samples of another seller. I have found that samples in the proportion of 1 to 8000 are workable for deliveries of less than 500 pounds of milk per day; samples in the proportion of 1 to 16,000 for deliveries from 500 to 1000 pounds per day; samples in the proportion of 1 to 24,000 for deliveries from 1000 to 2000 pounds per day; and samples in the proportion of 1 to 48,000 for deliveries of more than 2000 pounds per day.

It is one of the objects of my invention to provide an improved device of the type specified for taking a sample by suction or otherwise into a receptacle from a container holding a known weight of milk or other liquid to be sampled, on the above specified proportionate basis or otherwise, with the suction means operated by a rotary or other movable member which moves proportionately to the amount of milk or other liquid taken up, and with differential scale means in connection with such movable means by which the amount of movement required for taking up the desired sample upon any of the several ratio bases may be indicated.

It is another object of my invention to improve devices of this type in sundry details hereinafter pointed out. The preferred means by which I have accomplished my several objects are illustrated in the drawing and are hereinafter specifically described. That which I believe to be new and desire to cover by Letters Patent is set forth in the claims.

In the drawing,—

Fig. 1 is an elevational view of my improved device, with parts broken away and other parts shown diagrammatically by dotted lines for clearness of illustration;

Fig. 2 is a view of the part shown in Fig. 1 as seen from the right in said figure, with the cylinder partially broken away at the bottom, with the scale drum shown in solid lines, and with a portion of the view in section as taken at the line 2—2 of Fig. 1;

Fig. 3 is a face view of a portion of the scale drum and index plate shown upon an enlarged scale; and Fig. 4 is an enlarged detail view showing the construction at the lower end of the cylinder.

Referring now to the several figures of the drawing, in which corresponding parts are indicated by the same reference characters, 9 indicates a framework of any approved type comprising an upright bar 10 and an oppositely disposed bar 11 in the form of a bracket. A cylinder 12 of even bore throughout is fixedly secured to the frame at the lower end thereof, with the cylinder positioned longitudinally of the frame. A shaft 13 is journalled in the upper ends of the frame bars 10 and 11, having a drum 14 mounted thereon so as to rotate with the shaft. A pinion 15 is fixedly mounted upon the shaft at one side of the drum 14. A rack bar 16 meshes with the pinion 15 at its upper end, being pivotally connected at its lower end with a piston rod 17 connected at its lower end with a piston 18 of any approved type adapted to operate effectively in both directions. The rack bar 16 is held normally in mesh with the pinion 15 by means of a bracket 19 mounted upon the frame bar 10 and extending about such rack bar. A handle 20 is provided upon the frame bar 11 for enabling an operator conveniently to support the device. In the arrangement shown a crank 21 is mounted upon the shaft 13 for applying rotary movement thereto, the size of the pinion 15 being such that the piston is given a complete stroke lengthwise of the cylinder by two complete revolutions of the pinion and the drum 14.

In the arrangement shown, the lower end of the cylinder 12 is provided with a closure plate 22 which is provided with an opening 23 therein of limited size for the admission of milk or other liquid into the lower end of the cylinder upon the upward movement of the piston 18. The wall of the cylinder 12 is provided with an opening 24 in position to register with the opening 23.

Upon the face of the drum 14, I have provided a plurality of scales indicated in the construction shown by the numerals 25, 26, 27 and 28. In the position of the parts as shown in Fig. 3, which corresponds to the lowermost position of the piston, as shown in Fig. 4, the scales 25 and 26 are standing in their zero position with respect to an index plate 29 secured upon the frame bar 11 and extending across the face of the drum, such plate 29 being provided with a slot 30 therein within which a row of numerals of the several scales are adapted to show. The several scales 25, 26, 27 and 28 extending entirely about the drum 14 are calibrated with reference to the weight of the milk or other liquid being sampled, being graduated at the ratios of 1 to 2 to 3 to 6. The scale 25 is graduated from 0 to 500 corresponding to the movement of the piston from its lowermost position to about the middle part of the cylinder brought about by a single revolution of the drum 14. The scale 26 is graduated from 0 to 1000 corresponding to a similar movement of the piston upon a single complete revolution of the drum. The scale 27 is graduated upon the basis of 2100 pounds to one and two-fifths complete revolutions of the drum, with the marked graduations beginning at a point spaced two-fifths of a revolution about the drum from the zero points of the scales 25 and 26 and running from there entirely about the drum, being numbered from 600 to 2100; the latter avoids the provision of a double column of figures at the zero to 600 portion of the scale 27. The scale 28 is graduated upon the basis of 4200 pounds corresponding to one and two-fifths complete revolutions of the drum, with the graduations as marked likewise beginning at a point spaced two-fifths of a revolution about the drum from zero points of the scales 25 and 26 and extending from there about the drum with the numbers running from 1200 to 4200; as for the scale 27, this avoids the provision of two columns of figures for part of the scale 28.

As will be readily appreciated, the drum 14 is normally to be given only a single revolution or less when the scale 25 or 26 is employed. If it should be desired for any special purpose to give the drum more than a single complete rotation when the scale 25 or 26 is being employed, the reading for such extended rotation of the drum would be that shown at the index slot 29 plus the 500 or 1000 corresponding to the first complete rotation. If it should be necessary to employ the scale 27, as when a batch of milk to be sampled by the use of this scale weighs less than 600 pounds, the necessary determination for the degree of operation of the sampling pump can be readily made by dividing the weight of the batch by three and working to the resulting quotient on the scale 25; this is possible because the readings on the scale 25 for an initial revolution of the drum are always just one-third of the corresponding values for the scale 27. Correspondingly small values can be readily determined for the scale 28, of course, by dividing the weight of the quantity to be sampled by six and using the resulting quotient as a basis for operating the pump in the described manner.

In the use of my improved device, when the lower end of the cylinder 12 is inserted into a weighing vat or other receptacle containing a liquid and the pinion 15 is rotated by power applied through the drum 14 or through the crank handle 21, the piston 18 is drawn upwardly in the cylinder causing the cylinder to be filled with liquid below the piston. When the drum 14 is later revolved in the opposite direction, the milk or other liquid is expelled through the openings 23 and 24 serving to empty the cylinder 12. As will be readily understood, the upward movement of the piston 18 in such operation of the device is in all cases directly proportional to the angular or rotary movement of the drum 14.

In practice, each patron is arbitrarily assigned to the use of the particular scale corresponding to the amount of milk ordinarily delivered by him. Upon delivery, the weight of the milk is first determined. My improved sampling device is then inserted in the weighing vat containing the milk and the drum 14 is rotated until the number corresponding to the weight of the milk delivered is shown on the assigned scale in the slot 30 of the index plate 29. It will be understood that the same scale must be used from day to day for a given patron regardless of the amount of milk delivered at any one particular time.

By the use of my improved device as above explained, if a seller should deliver 100 pounds of milk per day, using the scale 25, the drum 14 would, of course, be given substantially one-fifth of a complete rotation, serving to give the piston one-tenth of a complete stroke for drawing into the cylinder a correspondingly sized sample. The composite sample for eight daily deliveries under such circumstances in the use of the device as used by me in practice would be found to aggregate approximately 1½ ounces, which is ample for the required tests. If 2100 pounds of milk were delivered each day by a patron assigned to use scale 27, the drum 14 would be given approximately one and two-fifths complete rotations, the composite sample for eight days in such case amounting to about 11 ounces which is small enough an amount as to be readily kept during the testing period without any extensive storage space therefor.

By the use of my improved apparatus, a sample is taken from each delivery strictly in proportion to the amount of milk delivered, the sample on each day of a testing period being taken upon the same ratio basis as upon each other day of said period.

As will be readily understood by those familiar with dairy practices, my improved device is adapted for use also for taking plant composites as well as for taking individual patron composites. In connection with plant composites, the scale to be employed would be selected on the basis of the average deliveries. Inasmuch as the device would be used in taking plant composites in the same manner as above described so far as the actual physical operations are concerned, it is believed to be unnecessary to describe the same further herein.

While I prefer to employ the form of device as shown in my drawing and as above described, it will be understood that my invention is not to be limited thereto except so far as the claims may be so limited by the prior art.

I claim:—

1. A portable proportional sampler for liquids, comprising a cylinder, a piston in said cylinder adapted upon an operative stroke to draw liquid into the cylinder in proportion to the movement, a member rotatably mounted with respect to said cylinder, a crank handle connected with said rotatable member for rotating the member, means adapted upon rotary movement of said member to give said piston an operative stroke in proportion to the rotary movement of the member, a drum rotatable with said member, an index adjacent to said drum, and a plurality of scales mounted on said drum suitably calibrated so as to be adapted by changed position with reference to said index to indicate differentially the rotary movement required for obtaining samples of different predetermined size ratios as compared with the different sized quantities of liquid being sampled.

2. A portable proportional sampler for liquids, comprising an elongated upright frame, a handle on the upper end portion of said frame for manipulating the device for operation, a cylinder mounted on the lower end portion of said frame longitudinally thereof and having an opening at its lower end, a piston in said cylinder adapted upon an upward stroke in said cylinder to draw liquid thereinto, a member rotatably mounted on said frame at its upper end portion, means adapted upon rotary movement of said member to give said piston an operative stroke in the cylinder proportional to said rotary movement, an index on said frame, and a plurality of scales mounted on said rotary member suitably calibrated so as to be adapted by changed position with reference to said index to indicate differentially the rotary movement required for obtaining samples of different predetermined desired size ratios as compared with the different sized quantities of liquid being sampled.

3. A portable proportional sampler for liquids, comprising an elongated upright frame, a handle on the upper end portion of said frame for manipulating the device for operation, a cylinder mounted on the lower end portion of said frame longitudinally thereof and having an opening at its lower end, a piston in said cylinder adapted upon an upward stroke in said cylinder to draw liquid thereinto, a shaft rotatably mounted in horizontal position on said frame at its upper end portion, a gear rotatable with said shaft, a rack bar meshing with said gear and connected with said piston for reciprocating the piston in said cylinder, an index on said frame, and a plurality of scales adapted to move with said gear and being suitably calibrated so as to be adapted by changed position with reference to said index to indicate differentially the rotary movement required for obtaining samples of different predetermined desired size ratios as compared with the different sized quantities of liquid being sampled.

4. In a portable proportional sampler for liquids, a suction tube for extension into a weighed mass of liquid to be sampled, a piston operative in said tube and movable from the intake end thereof for drawing a sample charge of the liquid into the tube from the mass of liquid, means for mechanical operation to effect said sampling movement of the piston, and indicator means associated with the piston moving means and including a plurality of scales suitably calibrated so as to be adapted by changed position to indicate differentially the movement required for obtaining samples of different predetermined size ratios as compared with the different sized quantities of liquid being sampled.

WESTON W. FASSETT.